United States Patent
Wei

(10) Patent No.: US 7,783,292 B2
(45) Date of Patent: Aug. 24, 2010

(54) APPARATUS, METHOD, AND COMPUTER PROGRAM PRODUCT PROVIDING ENHANCED RESOURCE ALLOCATION FOR A WIRELESS MESH NETWORK

(75) Inventor: Chao Wei, Beijing (CN)

(73) Assignee: Nokia Corporation, Espoo (FI)

( * ) Notice: Subject to any disclaimer, the term of this patent is extended or adjusted under 35 U.S.C. 154(b) by 797 days.

(21) Appl. No.: 11/701,035

(22) Filed: Jan. 31, 2007

(65) Prior Publication Data

US 2008/0181173 A1  Jul. 31, 2008

(51) Int. Cl.
*H04W 72/00* (2009.01)
(52) U.S. Cl. .................... 455/450; 455/451; 455/452.1; 455/452.2; 455/453
(58) Field of Classification Search .................. 455/450, 455/451, 452.1, 452.2, 453
See application file for complete search history.

(56) References Cited

U.S. PATENT DOCUMENTS

| 2002/0160784 A1 | 10/2002 | Kuwahara |
| 2006/0176839 A1 | 8/2006 | Frazer et al. |
| 2008/0057969 A1* | 3/2008 | Agami et al. ............... 455/450 |
| 2008/0107035 A1* | 5/2008 | Zhu et al. ................... 370/241 |
| 2008/0107076 A1* | 5/2008 | Ramachandran et al. .... 370/331 |
| 2008/0130531 A1* | 6/2008 | Chou ......................... 370/310 |
| 2008/0188231 A1* | 8/2008 | Zhu et al. ................... 455/450 |

FOREIGN PATENT DOCUMENTS

| EP | 0 522 391 A | 1/1993 |
| EP | 0 790 726 A2 | 8/1997 |

OTHER PUBLICATIONS

Wimax Forum: "WiMAX End-to-End Network Systems Architecture—(Stage 2: Architecture Tenets, Reference Model and Reference Points), Dec. 15, 2005 DRAFT", pp. 1-224.

* cited by examiner

*Primary Examiner*—Barry W Taylor
(74) *Attorney, Agent, or Firm*—Harrington & Smith

(57) ABSTRACT

Apparatus, methods and computer program products are provided that enable enhanced resource allocation for a wireless mesh network. A method includes: in response to receiving a resource request in a wireless mesh network, allocating, by a first node, at least one dedicated resource for communication with a second node; reserving at least one shared resource for use in conjunction with communications with the first node; and transmitting to the second node information corresponding to the allocated at least one dedicated resource and the reserved at least one shared resource.

23 Claims, 6 Drawing Sheets

APPARATUS, METHOD, AND COMPUTER PROGRAM PRODUCT PROVIDING ENHANCED RESOURCE ALLOCATION FOR A WIRELESS MESH NETWORK

TECHNICAL FIELD

The exemplary embodiments of this invention relate generally to wireless communication systems and, more specifically, relate to scheduling in a wireless mesh network.

BACKGROUND

The following abbreviations are utilized herein:
ACK acknowledgement
AG access gateway
BE best effort
BS base station
CN correspondent node
HARQ hybrid automatic repeat-request
IEEE institute of electrical and electronics engineers
MN mobile node
NACK negative acknowledgement
QoS quality of service
RN relay node
rtPS realtime polling service
Wi-Fi WLAN based on the IEEE 802.11 standard
WiMAX worldwide interoperability for microwave access (IEEE 802.16 standard)
WLAN wireless local area network
WMN wireless mesh network A mesh network is a network that employs one of two connection arrangements, full mesh topology or partial mesh topology. In the full mesh topology, each node is connected directly to each other node. In the partial mesh topology, nodes are connected to only some, not all, of the other nodes.

A WMN is a wireless network that handles many-to-many connections and is capable of dynamically updating and optimizing these connections. This may be (but does not have to be) a "mobile network" in which it is assumed that each (or at least some) of the nodes of the network are mobile units (e.g., MNs) that change position over time. The dynamic management of complex routing information, very likely to include information about external networks (e.g., the internet and gateways thereto), is arguably the biggest challenge for (dynamic) mesh protocols. WMNs may communicate in accordance with various communication standards such as Wi-Fi and WiMAX, as non-limiting examples.

Within a WMN, a system that has a direct connection to an IP backbone is termed a mesh BS or AG. Usually there is no direct link from MNs to an AG and traffic is routed through one or more hops over RNs. Therefore, the scheduling in WMNs should consider multi-hops. There are two conventional mechanisms to schedule data transmission in WMNs: centralized scheduling and distributed scheduling. In centralized scheduling, the AG or mesh BS collects the control and data packet information to determine the resource assignment for each node and ensures that transmissions are coordinated to ensure collision-free scheduling. When using distributed scheduling, each RN or mesh router performs independent scheduling while coordinating with their extended neighbors. Distributed scheduling is generally more flexible and efficient on data transmission in WMNs due to the distributed channel access control.

SUMMARY

In an exemplary aspect of the invention, a method includes: in response to receiving a resource request in a wireless mesh network, allocating, by a first node, at least one dedicated resource for communication with a second node; reserving at least one shared resource for use in conjunction with communications with the first node; and transmitting to the second node information corresponding to the allocated at least one dedicated resource and the reserved at least one shared resource.

In another exemplary aspect of the invention, a computer program product is provided. The computer program product includes program instructions embodied on a tangible computer-readable medium. Execution of the program instructions results in operations including: in response to receiving a resource request in a wireless mesh network, allocating, by a first node, at least one dedicated resource for communication with a second node; reserving at least one shared resource for use in conjunction with communications with the first node; and transmitting to the second node information corresponding to the allocated at least one dedicated resource and the reserved at least one shared resource.

In a further exemplary aspect of the invention, a device includes: a receiver configured to receive a resource request in a wireless mesh network; a data processor coupled to the receiver, wherein the data processor is configured to allocate at least one dedicated resource to a requesting node and reserve at least one shared resource for use in conjunction with communications with the scheduling node; and a transmitter coupled to the data processor, wherein the transmitter is configured to transmit to the requesting node information corresponding to the allocated at least one dedicated resource and the reserved at least one shared resource.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

While the exemplary embodiments of the invention are described below in the context of a WMN, it should be appreciated that the exemplary embodiments of this invention are not limited for use with only this one particular type of wireless communication system, and that they may be used to advantage in other wireless communication systems, such as other mesh networks or other networks comprising multi-hop communications.

Figure 1:
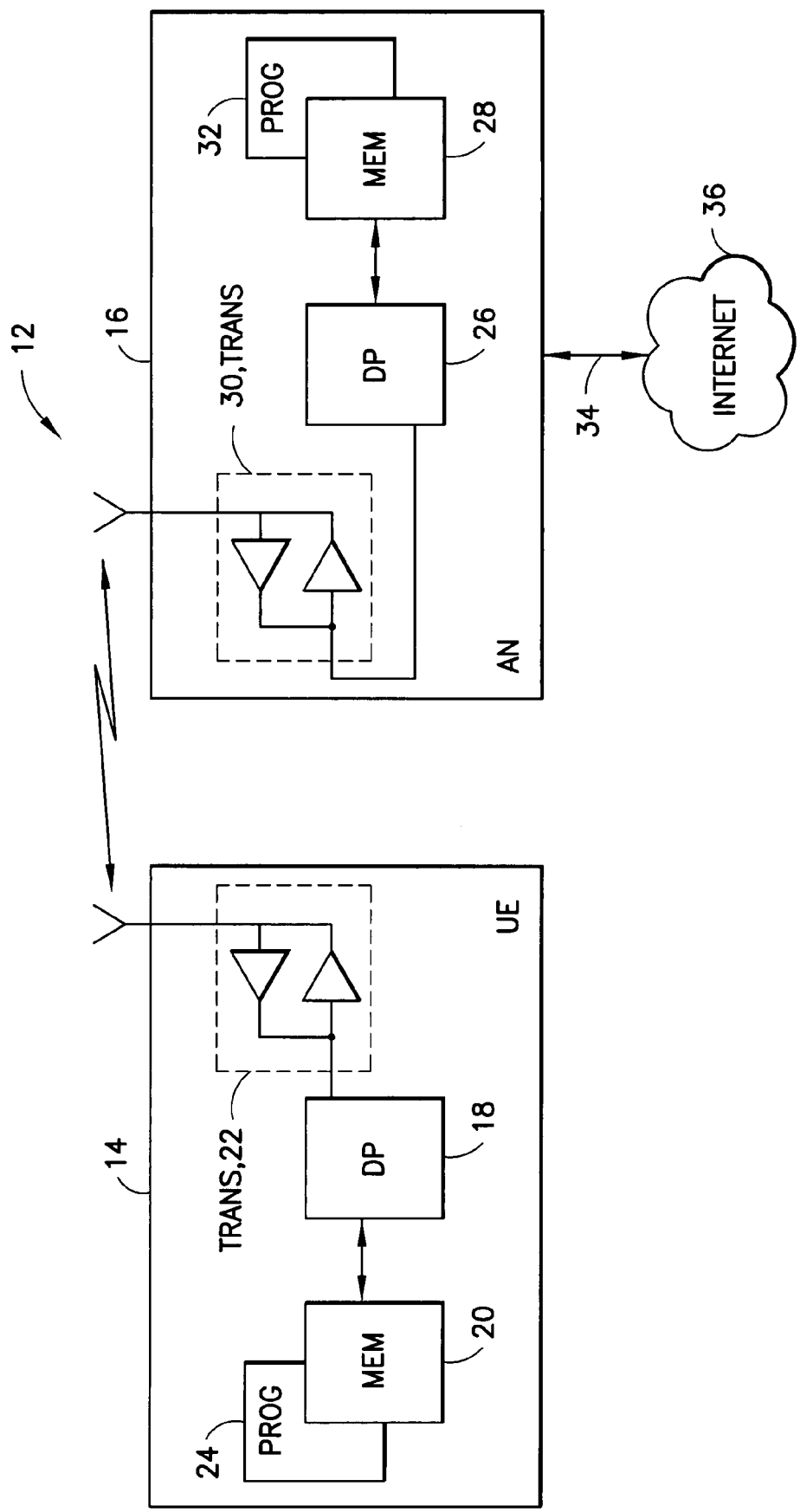
FIG. 1 illustrates a simplified block diagram of an electronic device that is suitable for use in practicing the exemplary embodiments of this invention.

Reference is made to FIG. 1 for illustrating a simplified block diagram of various electronic devices that are suitable for use in practicing the exemplary embodiments of this invention. In FIG. 1, a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has at least one antenna to facilitate communication.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the UE 14. Note that the TRANS 30 has at least one antenna to facilitate communication. The AN 16 is coupled via a data path 34 to one or more external networks or systems, such as the internet 36, for example.

At least one of the PROGs 24, 32 is assumed to include program instructions that, when executed by the associated DP, enable the electronic device to operate in accordance with the exemplary embodiments of this invention, as discussed herein.

In general, the various embodiments of the UE 14 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by one or more of the DPs 18, 26 of the UE 14 and the AN 16, or by hardware, or by a combination of software and hardware.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

Figure 2:
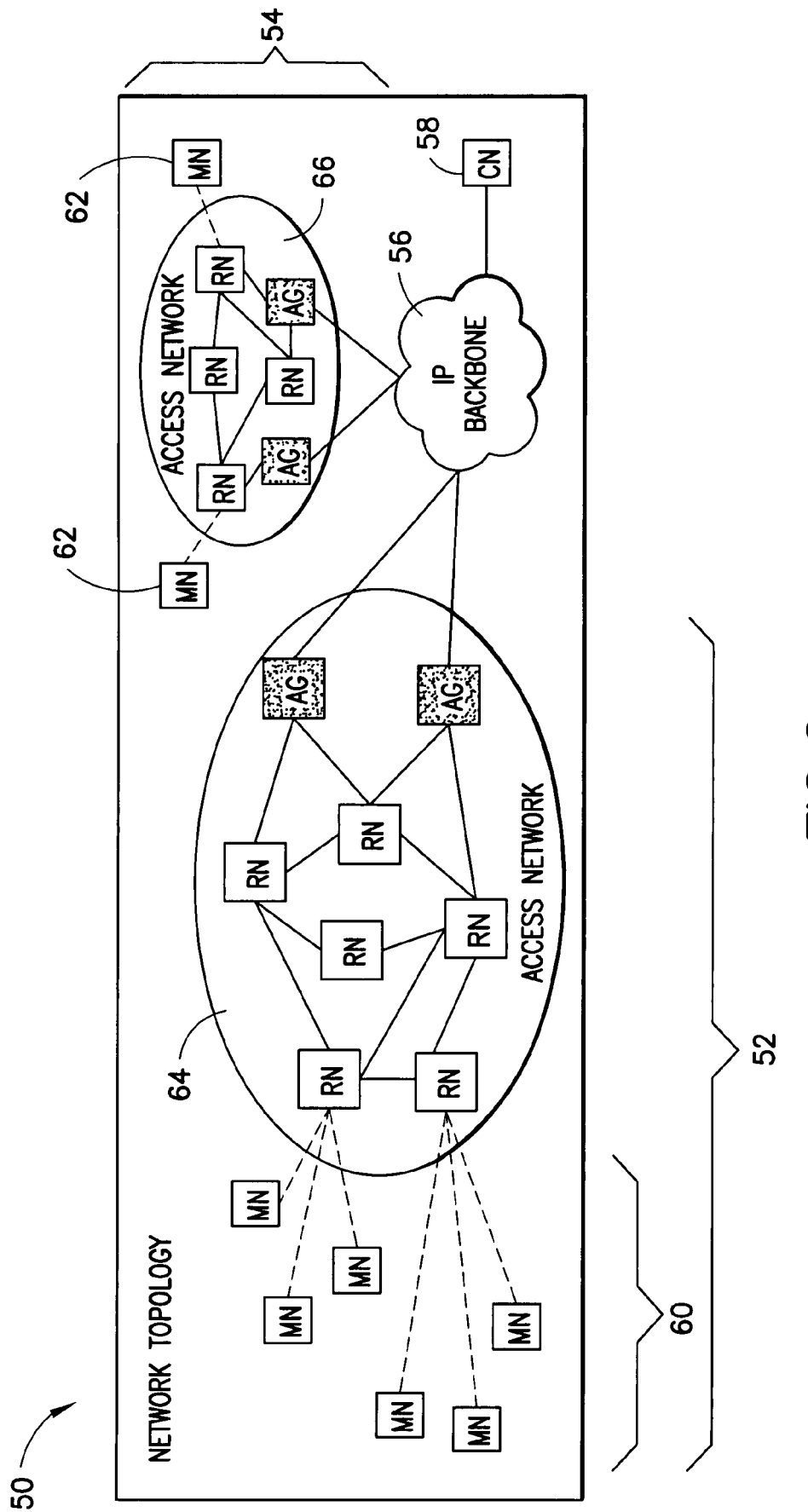
FIG. 2 shows an exemplary network topology within which the exemplary embodiments of the invention may be utilized.

Referring to FIG. 2, an exemplary network topology 50 is shown within which the exemplary embodiments of the invention may be utilized. In FIG. 2, the network topology 50 comprises a plurality of WMNs 52, 54, with each WMN 52, 54 coupled to an IP backbone 56. The IP backbone 56 is also coupled to a CN 58. Each WMN 52, 54 comprises a plurality of MNs 60, 62 and an access network 64, 66. Each access network 64, 66 comprises a plurality of RNs and at least one AG. The RNs, via communication links with the AGs, enable a connected MN to communicate with other nodes in the WMN or with other nodes and devices through a connection (e.g., via an AG in the WMN) with the IP backbone 56. In other embodiments, WMNs may comprise a greater or lesser number of MNs, RNs and AGs than that shown in the exemplary network topology of FIG. 2. In further embodiments, other networks and/or other types of networks and entities may be connected with one or more of the WMNs 52, 54. In other embodiments, the CN 58 is not present. In further embodiments, other networks and/or other types of networks may be connected to the IP backbone 56.

An example of the distributed scheduling used by WiMAX (802.16) mesh is described below to illustrate scheduling and resource allocation in a WMN.

Figure 3:
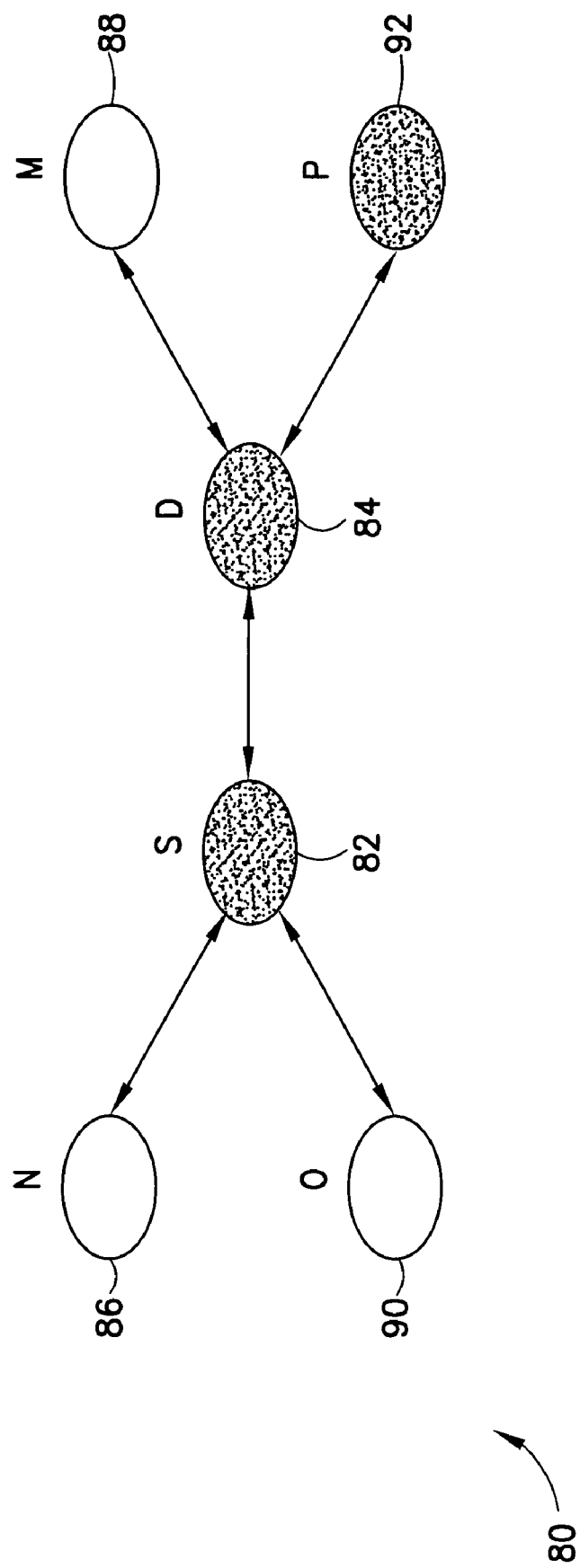
FIG. 3 depicts a conventional mesh network topology.

FIG. 3 depicts a conventional mesh network topology 80. The nodes shown in FIG. 3 comprise nodes in a WMN, with each node directly connected only with its immediate neighbors. As shown in FIG. 3, if a node S 82 wants to send data to a receiving node D 84, the node S 82 first sends a request message along with slot availability information to the receiving node D 84. After receiving the request, the node D 84 responds with a grant message indicating all or a subset of the suggested availabilities that fit the request. The grant message is also broadcasted to other 1-hop neighbors of the node D 84 (node M 88 and node P 92) and these nodes will assume the transmission takes place as granted and write the slot allocation information to their memory. When the requester S 82 receives the grant message, it transmits a confirmation message to the receiver D 84 containing a copy of the granted slots. The requester S 82 also broadcasts the slot schedule information to its 1-hop neighbors (node N 86 and node O 90). Then, the 1-hop neighbors of the requester S 82 (node N 86 and node O 90) cannot use the allocated slots. In such a manner, with the so-called "request/grant/confirm" three-way handshaking procedure, node S 82 is assigned a number of slots in which data transmission will not interfere with other neighboring node transmissions.

From the above, one can see that in order to ensure collision-free transmissions, the scheduler in WMNs usually assigns the dedicated resources, such as independent time slots, for each node. The resources assigned to one node cannot be used by its neighbors in order to avoid collision and interference. The scheduling results should be broadcast to neighbors of both the requester and receiver in order to provide up-to-date slot allocation information. In WMNs, there are limited resources (e.g., beacon slots) for broadcasting and each node competes with other nodes for transmission opportunities. Therefore, the latency of the above three-way handshake procedure may be relatively large.

The above-described dedicated resource allocation method works fine for real-time service flows that have fixed bandwidth requests, such as VoIP without silence suppression. Because the sending node only negotiates with neighboring nodes for resource allocation during the connection setup, there is no need to subsequently request or obtain updates concerning resource allocations. However, for rtPS which generate variable size data packets on a periodic basis (e.g., MPEG video), the mesh scheduler must periodically negotiate with neighboring nodes for resource updates and provide periodical resource grants. This may cause two problems. First, the negotiation may not be successful since the scheduler usually employs the "first-request-first-serving" rule. If the required resources have been assigned to other nodes, the scheduling request by the node for rtPS services will fail. The direct impact is that the real-time traffic will be delayed (e.g., transmissions to the destination node), likely resulting in packet loss. The second problem is the time it takes to negotiate with neighbors for resource updates. Although the request for resource updates can be communicated directly between the sending node and the receiving node by using the previously assigned resources for data transmission, the resource update messages also need to be broadcast to all other neighbors of both the requester and receiver before coming into use. Such scheduling delays will likely affect the data transmissions between the sending node and the receiving node.

One simple, inefficient solution is to assign (i.e., allocate) the maximum requested resources during the connection setup and not update the resource allocation during transmission. However, this is clearly not efficient since resource utilization is not maximized (e.g., a node may not use all of the resources allocated for its communication).

A similar problem applies to the resource request for HARQ. Since it is likely impossible to estimate the probability of retransmission and when the retransmission will start, the requested resources for HARQ retransmission cannot be considered at the connection setup. Therefore, the mesh scheduler must subsequently negotiate with neighbors for the HARQ resource request when there is an erroneous transmission. Similar to the previously-discussed rtPS services, both the delay and the resource utilization need to be considered when scheduling the HARQ retransmission.

In order to address the above problems, an exemplary embodiment of this invention proposes a modified resource allocation approach for the mesh scheduling algorithms. During the connection setup, the mesh scheduler not only assigns dedicated resources for the requested, but also reserves a certain amount of shared resources for the requester. The assigned dedicated resources are similar to the existing scheduling algorithm and may be based on traffic demand at the connection setup, as a non-limiting example. The shared resources are reserved for bandwidth requests after connection setup, such as for rtPS traffic or HARQ retransmission, as non-limiting examples. These additional resources can be shared with neighbors in order to maximize channel utilization. Since the assigned shared resources are determined at the connection setup, the node can use them directly without further negotiation (e.g., without broadcasting the results to all other neighbors) and thus the scheduling delay is minimized.

Consider a wireless mesh network similar to the one shown in FIG. 3. During the connection setup, the sending node S requests and is allocated dedicated resources (e.g., based on the current traffic demand). Also during connection setup, a certain amount of resources (e.g., slots) are reserved to be shared with 1-hop neighbors of the receiving node D (e.g., node S and node M).

Figure 4:
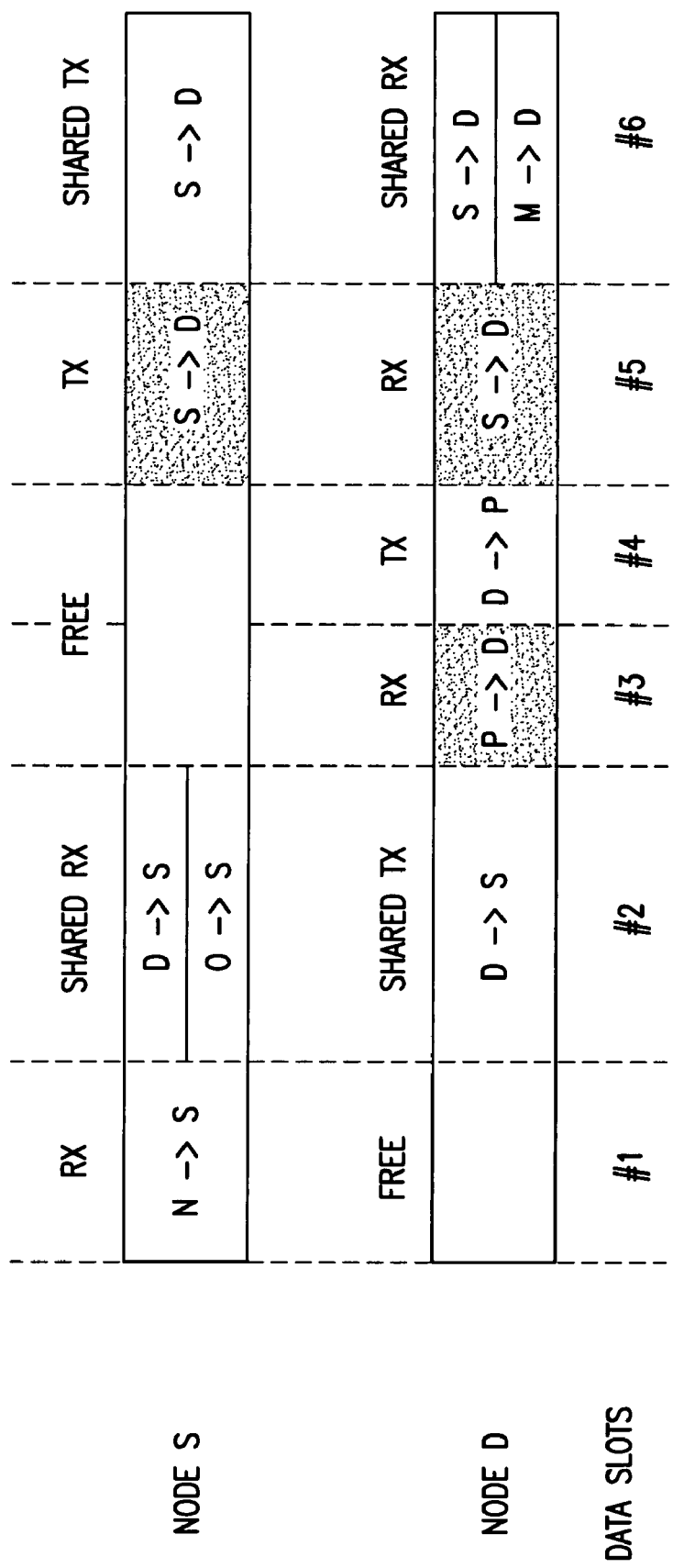
FIG. 4 illustrates an exemplary embodiment of the invention wherein, during connection setup, a node is allocated dedicated resources and an amount of shared resources is reserved.

FIG. 4 illustrates an exemplary embodiment of the invention wherein, during connection setup, a node S is allocated dedicated resources for transmission (TX) and an amount of shared resources is reserved (Shared TX). The shared resources may be used for connections with the receiving node D (i.e., the shared resources may be used by the receiving node D or 1-hop neighbors of node D, namely node S or node M).

Since transmissions on the shared slots can interfere with each other, a control mechanism may be utilized to coordinate transmissions on the shared slots. However, it is noted that only nodes who share the same slots are involved in the shared resource scheduling and there is no need to broadcast the scheduling results to all other neighboring nodes. As non-limiting examples, two methods to control the transmission on the shared slots are presented. The first is that the receiving node (node D) periodically measures the interference level of the shared slots and sends the measurement reports to all related sending nodes, such as node S and node M. The sending node can determine when and how to use the shared slots based on the received measurement reports and traffic requirements. In order to reduce the signaling overhead, the receiving node may send the measurement report only when the interference level is higher than a predefined threshold.

The second method is that the receiving node may schedule the shared slots based on the received request from the sending node such that the nodes cannot use the shared slots without a grant from the receiving node. In this sense, the shared slots are time multiplexed for the related nodes but under the control of the receiving node. In such a manner, the shared slots may be seen as temporary dedicated resources for each related node. As a result, the switching point between dedicated and shared resource allocations may be dynamically adjusted by the receiving node. The second method is generally preferable since it may guarantee QoS for data transmission on the shared slots.

Figure 5:
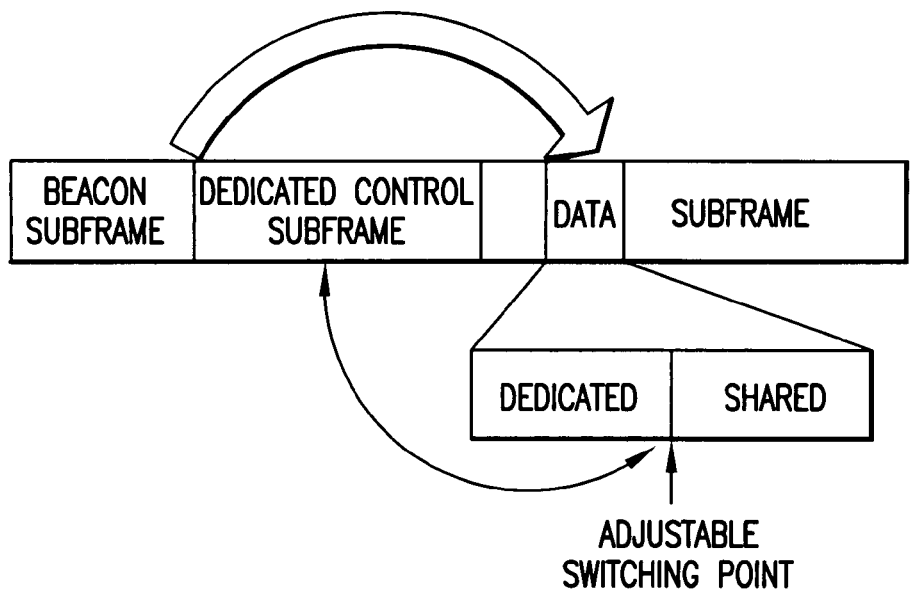
FIG. 5 shows an exemplary embodiment of the invention wherein, at the connection setup, a beacon subframe is used to assign the dedicated and shared resources for the requesting node.

The proposed resource allocation methods can be implemented in a wireless mesh network, such as WiMAX (IEEE 802.16) mesh. As shown in FIG. 5, in one exemplary embodiment, the beacon subframe which is used to transmit scheduling information and broadcast the scheduling results to all neighbors is used to assign the resources (i.e., the dedicated and shared slots) for the requesting node at the connection setup. The dedicated control subframe following the beacon subframe provides a fast control link between the sending and receiving nodes, and therefore can be used to transfer the messages to request and grant the shared slots as well as HARQ feedback (ACK or NACK). The allocation in the dedicated control subframe can be centralized (e.g., coordinated by the AG) or distributed (e.g., assigned together with data scheduling by using the request/grant/confirm three-way handshaking procedure).

The following sections give examples of how the exemplary embodiments of the invention can be applied to improve the scheduling of rtPS services and HARQ retransmission.

rtPS Services:

For rtPS services, the required resources are periodically changed due to the variable bandwidth request. Therefore, during the connection setup the minimum bandwidth request can be allocated by the dedicated resources. The maximum data rate request is then included in the shared resources. In order to guarantee the QoS requirements of the rtPS services, it may be preferable to share the slots with a neighboring node that is transmitting lower QoS requirement services, such as BE services, as a non-limiting example. During the transmission, the rtPS services node periodically sends the request to the receiving node to adjust the switching point and update the shared slots allocation. The unused shared slots may be assigned to other neighboring nodes with best effort services in order to maximize the resource utilization.

HARQ Retransmission:

When considering HARQ retransmission, the resource request at the connection setup should be double, and the shared resource request may then be equal to the dedicated resource request. The shared resources may be used only for HARQ retransmission and can be time multiplexed with other 1-hop nodes of the receiving node. When the receiving node sends a NACK to one sending node to trigger HARQ retransmission, it may also send scheduling information to enable the sending node to utilize the shared resources for HARQ retransmission. The sending node then transmits the new packet on the dedicated resource(s) and the erroneous packet on the shared resource(s) in the following frame. In such a manner, the delay for HARQ retransmission can be minimized. If two shared nodes both need retransmission at the same time, the receiving node can determine priority for using the shared resources. If the channel resource is not a limiting factor, then more shared resources can be assigned during the connection setup so that simultaneous retransmission from multiple nodes may be implemented by different slots in the shared resources.

Figure 6:
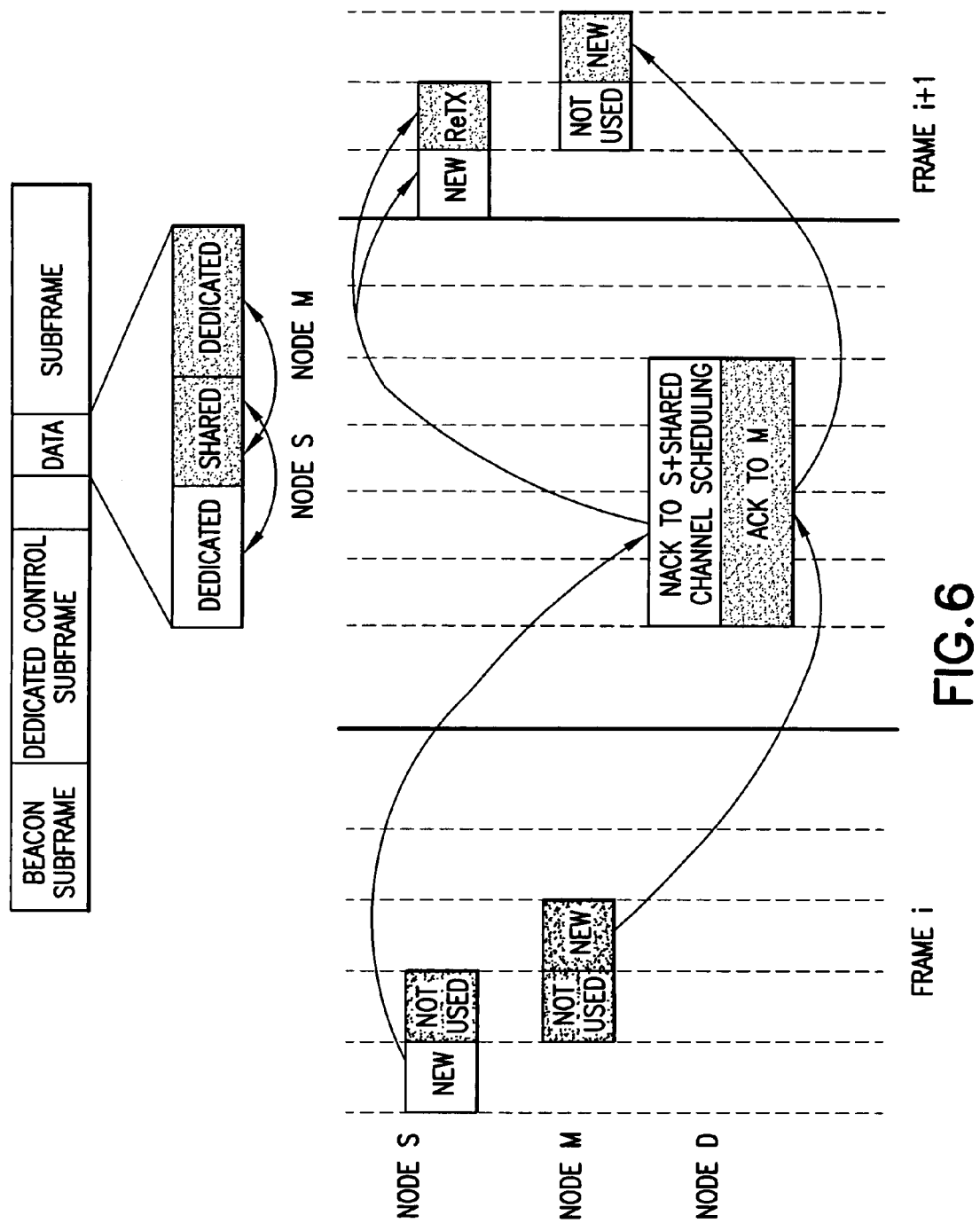
FIG. 6 depicts an exemplary embodiment of the invention as utilized for a HARQ retransmission between nodes D and S.

FIG. 6 depicts an exemplary embodiment of the invention as utilized for a HARQ retransmission between nodes D and S. As shown in FIG. 6, each of node S and node M (the serving nodes) has its own dedicated portion of resources. In addition, shared resources are reserved for use by node M or node S. The allocation of dedicated and shared resources is performed, controlled and maintained by node D (the scheduling node). Further note that node S and node M comprise the 1-hop nodes from node D.

In frame i, the shared resources are not used by node S or node M. However, in response to frame i, node D sends node S a NACK and shared channel scheduling data that indicates to node S that it is allocated the shared resources for frame i+1. Node D also sends node M an ACK. Thus, in frame i+1, node S utilizes the shared resources for HARQ retransmission.

Figure 7:
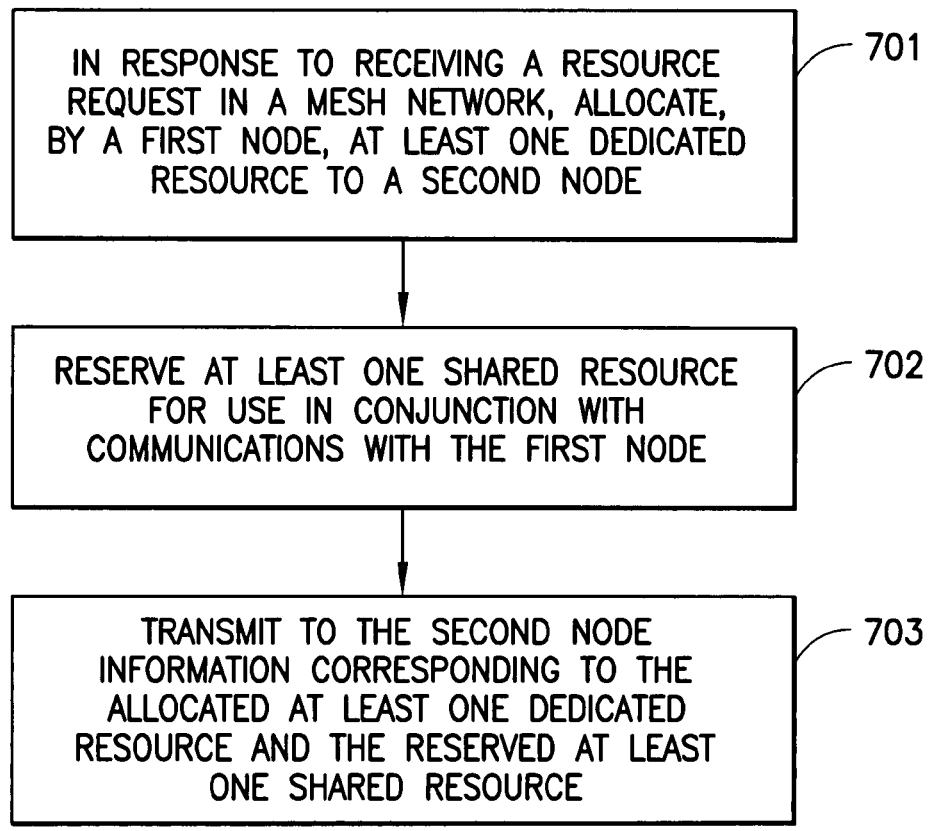
FIG. 7 depicts a flowchart illustrating one non-limiting example of a method for practicing the exemplary embodiments of this invention.

FIG. 7 depicts a flowchart illustrating one non-limiting example of a method for practicing the exemplary embodiments of this invention. The method includes: in response to receiving a resource request in a mesh network, allocating, by a first node, at least one dedicated resource for communication with a second node (box 701); reserving at least one shared resource for use in conjunction with communications with the first node (box 702); and transmitting to the second node information corresponding to the allocated at least one dedicated resource and the reserved at least one shared resource (box 703).

In other embodiments, reserving the at least one shared resource and transmitting the information are performed by the first node. In further embodiments, the information comprises first information and the method further comprises: determining, by the first node, if the second node should be allowed to utilize the at least one shared resource; and in response to determining that the second node should be allowed to utilize the at least one shared resource, transmitting to the second node second information indicating that the second node may utilize the at least one shared resource. In other embodiments, the method further comprises: in response to receiving the second information, utilizing, by the second node, the at least one shared resource for one of realtime polling service traffic or hybrid automatic repeat-request retransmission. In further embodiments, the method is performed during a connection setup between the first node and the second node. In other embodiments, the at least one shared resource may be utilized only for communications between the first node and a one-hop node located one-hop from the first node.

In further embodiments, the method further comprises: measuring an interference level of the at least one shared resource; and transmitting a measurement report to the second node. In other embodiments, measuring the interference level and transmitting the measurement report are performed by the first node. In further embodiments, transmitting the measurement report comprises transmitting the measurement report to all nodes located one-hop from the first node. In other embodiments, the method further comprises: comparing the measured interference level to a predefined threshold value, wherein the measurement report is transmitted in response to the interference level being higher than the predefined threshold value. In further embodiments, the wireless mesh network comprises a WiMAX network in accordance with the 802.16 standard. In other embodiments, a receiver-guided shared resource allocation algorithm is used to ensure fairness and maximize spectrum efficiency.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention provide enhanced resource allocation in a multi-hop wireless network, such as a WMN, as a non-limiting example. As non-limiting examples, the exemplary embodiments of the invention further provide enhanced resource allocation for services with variable bandwidth requests and for HARQ retransmission in a wireless mesh network. Resource utilization may be improved by communications with different QoS requirement services sharing the same resources. In other embodiments, fairness may be ensured by a receiver guided shared resource allocation algorithm. Scheduling delay is reduced since there is no need to negotiate with all neighbors. In addition, there is no need for resource updates after the connection setup, reducing the HARQ retransmission delay.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
in response to receiving a resource request from a second node in a wireless mesh network, allocating, by a first node, at least one dedicated resource for the second node, where the at least one dedicated resource is for communications between the first node and the second node;
in response to receiving the resource request from the second node, reserving at least one shared resource, where the at least one shared resource is for communications involving at least one of the first node and a one-hop neighboring node of the first node; and
transmitting, from the first node to the second node, first information corresponding to the allocated at least one dedicated resource and second information corresponding to the reserved at least one shared resource.

2. The method of claim 1, further comprising:
determining, by the first node, if the second node should be allowed to utilize the at least one shared resource; and
in response to determining that the second node should be allowed to utilize the at least one shared resource, transmitting to the second node third information indicating that the second node may utilize the at least one shared resource.

3. The method of claim 2, further comprising:
in response to receiving the third information, utilizing, by the second node, the at least one shared resource for one of realtime polling service traffic or hybrid automatic repeat-request retransmission.

4. The method of claim 1, wherein the method is performed during a connection setup between the first node and the second node.

5. The method of claim 1, further comprising:
measuring, by the first node, an interference level of the at least one shared resource; and
transmitting a measurement report to the one-hop neighboring node.

6. The method of claim 5, wherein transmitting the measurement report comprises transmitting the measurement report to all nodes located one-hop from the first node.

7. The method of claim 5, further comprising:
comparing the measured interference level to a predefined threshold value, wherein the measurement report is transmitted in response to the interference level being higher than the predefined threshold value.

8. The method of claim 1, wherein the wireless mesh network comprises a WiMAX network in accordance with the 802.16 standard.

9. The method of claim 1, wherein a receiver-guided shared resource allocation algorithm is used to ensure fairness and maximize spectrum efficiency.

10. The method of claim 1, wherein the at least one shared resource is only for communications involving at least one of the first node and a one-hop neighboring node of the first node.

11. A computer-readable medium tangibly embodying program instructions, execution of the program instructions by a data processor of a first node resulting in operations comprising:
in response to receiving a resource request from a second node in a wireless mesh network, allocating at least one dedicated resource for the second node, where the at least one dedicated resource is for communications between the first node and the second node;
in response to receiving the resource request from the second node, reserving at least one shared resource, where the at least one shared resource is for communications involving at least one of the first node and a one-hop neighboring node of the first node; and
transmitting to the second node, first information corresponding to the allocated at least one dedicated resource and second information corresponding to the reserved at least one shared resource.

12. The computer-readable medium of claim 11, execution of the program instructions resulting in operations further comprising:
determining if the second node should be allowed to utilize the at least one shared resource; and
in response to determining that the second node should be allowed to utilize the at least one shared resource, transmitting to the second node third information indicating that the second node may utilize the at least one shared resource.

13. The computer-readable medium of claim 12, execution of the program instructions resulting in operations further comprising:
in response to receiving the third information, utilizing, by the second node, the at least one shared resource for one of realtime polling service traffic or hybrid automatic repeat-request retransmission.

14. The computer-readable medium of claim 11, wherein the method is performed during a connection setup between the first node and the second node.

15. The computer-readable medium of claim 11, execution of the program instructions resulting in operations further comprising:
measuring an interference level of the at least one shared resource; and
transmitting a measurement report to the one-hop neighboring node.

16. The computer-readable medium of claim 15, wherein transmitting the measurement report comprises transmitting the measurement report to all nodes located one-hop from the first node.

17. The computer-readable medium of claim 15, execution of the program instructions resulting in operations further comprising:
comparing the measured interference level to a predefined threshold value, wherein the measurement report is transmitted in response to the interference level being higher than the predefined threshold value.

18. The computer-readable medium of claim 11, wherein a receiver-guided shared resource allocation algorithm is used to ensure fairness and maximize spectrum efficiency.

19. An apparatus comprising:
a transmitter;
a receiver;
a data processor; and
a memory including program instructions, the memory and the program instructions being configured to, with the data processor, cause the apparatus at least to perform: in response to the receiver receiving a resource request from another node in a wireless mesh network, allocating at least one dedicated resource to the other node, where the at least one dedicated resource is for communications between the apparatus and the other node; in response to the receiver receiving the resource request from the other node, reserving at least one shared resource, where the at least one shared resource is for communications involving at least one of the apparatus and a one-hop neighboring node of the apparatus; and transmitting, via the transmitter, to the other node first information corresponding to the allocated at least one dedicated resource and second information corresponding to the reserved at least one shared resource.

20. The apparatus of claim 19, the memory and the program instructions being configured to, with the data processor, cause the apparatus to further perform: determining if the other node should be allowed to utilize the at least one shared resource; and in response to determining that the other node should be allowed to utilize the at least one shared resource, transmitting to the other node, using the transmitter, third information indicating that the second node may utilize the at least one shared resource.

21. The apparatus of claim 19, wherein the data processor is further configured to: measure an interference level of the at least one shared resource; and transmit a measurement report to all nodes located one-hop from the apparatus.

22. The apparatus of claim 19, wherein the wireless mesh network comprises a WiMAX network in accordance with the 802.16 standard.

23. The apparatus of claim 19, wherein the apparatus is further configured to use a receiver-guided shared resource allocation algorithm to ensure fairness and maximize spectrum efficiency.

* * * * *